(12) United States Patent  
Hsu et al.

(10) Patent No.: US 10,732,442 B2  
(45) Date of Patent: Aug. 4, 2020

(54) OPTICAL DEVICE

(71) Applicant: YOUNG OPTICS INC., Hsinchu Science Park (TW)

(72) Inventors: Ya-Ling Hsu, Hsinchu (TW); Wei-Hung Tsai, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 16/423,443

(22) Filed: May 28, 2019

(65) Prior Publication Data

US 2020/0019000 A1 Jan. 16, 2020

(30) Foreign Application Priority Data

Jul. 12, 2018 (TW) .............................. 107124039 A (51) Int. Cl.
*G02F 1/13* (2006.01)
*G02F 1/1335* (2006.01)

(52) U.S. Cl.
CPC .. *G02F 1/1326* (2013.01); *G02F 2001/13355* (2013.01); *G02F 2202/022* (2013.01); *G02F 2203/023* (2013.01)

(58) Field of Classification Search
CPC ...... G02F 1/1326; G02B 27/017; G02B 27/44
See application file for complete search history.

(56) References Cited

U.S. PATENT DOCUMENTS

| | | | | |
|---|---|---|---|---|
| 6,082,861 A * | 7/2000 | Dove | ................. | G02B 27/1026 348/E9.027 |
| 6,726,329 B2 * | 4/2004 | Li | ........................ | G02B 27/283 345/46 |
| 6,952,241 B2 * | 10/2005 | Ouchi | ................... | G02B 27/283 348/742 |
| 7,529,024 B1 * | 5/2009 | Chen | ...................... | G02B 27/28 353/20 |
| 8,087,785 B2 * | 1/2012 | Chen | ..................... | H04N 9/3167 353/20 |
| 10,281,715 B2 * | 5/2019 | Lin | ....................... | G02B 26/085 |
| 2006/0181758 A1 * | 8/2006 | Willis | ................... | H04N 5/7416 359/238 |
| 2007/0024825 A1 * | 2/2007 | Stephanes Maria De Vaan | .......... | H04N 9/3114 353/98 |

(Continued)

FOREIGN PATENT DOCUMENTS

WO WO 2017/178781 A1 10/2017

*Primary Examiner* — Rhonda S Peace
(74) *Attorney, Agent, or Firm* — Muncy, Geissler, Olds & Lowe, P.C.

(57) ABSTRACT

An optical device includes a waveguide device, a reflective-type light valve and a projection lens. The waveguide device receives a first polarized beam and includes a first surface, a second surface and the first grating. The first grating is disposed in a path of the first polarized beam to change a propagation direction of the first polarized beam, and the first polarized beam passes through the first surface, the first grating and the second surface in succession. The reflective-type light valve is disposed downstream from the second surface of the waveguide device to convert the first polarized beam into an image beam. The projection lens is disposed downstream from the reflective-type light valve, and the image beam passing through the second surface of the waveguide device, the first grating and the projection lens in succession.

20 Claims, 7 Drawing Sheets

(56) References Cited

U.S. PATENT DOCUMENTS

| | | | |
|---|---|---|---|
| 2007/0188837 A1* | 8/2007 | Shimizu | G02B 5/203 |
| | | | 359/13 |
| 2009/0128781 A1* | 5/2009 | Li | G02B 6/0008 |
| | | | 353/20 |
| 2011/0002143 A1* | 1/2011 | Saarikko | B29D 11/00663 |
| | | | 362/611 |
| 2014/0140654 A1* | 5/2014 | Brown | G02F 1/29 |
| | | | 385/10 |
| 2017/0030550 A1 | 2/2017 | Popovich et al. | |
| 2017/0356801 A1 | 12/2017 | Popovich et al. | |
| 2018/0284460 A1* | 10/2018 | Cheng | G02B 27/1026 |
| 2019/0353954 A1* | 11/2019 | Lo | G02F 1/13363 |
| 2020/0019000 A1* | 1/2020 | Hsu | G02F 1/1326 |

* cited by examiner

OPTICAL DEVICE

BACKGROUND OF THE INVENTION a. Field of the Invention

The invention relates to an optical device.

b. Description of the Related Art

Nowadays, various image display technologies have been widely used in different kinds of portable devices. Therefore, it is an important design goal to provide a miniaturized and slim optical module used in these portable devices.

BRIEF SUMMARY OF THE INVENTION

In one aspect of the present disclosure, an optical device includes a waveguide device, a reflective-type light valve and a projection lens. The waveguide device receives a first polarized beam and includes a first surface, a second surface and the first grating. The first grating is disposed in a path of the first polarized beam to change a propagation direction of the first polarized beam, and the first polarized beam passes through the first surface, the first grating and the second surface in succession. The reflective-type light valve is disposed downstream from the second surface of the waveguide device in a light path to convert the first polarized beam into an image beam. The projection lens is disposed downstream from the reflective-type light valve in the light path, and the image beam passing through the second surface of the waveguide device, the first grating and the projection lens in succession.

In another aspect of the present disclosure, an optical device includes a waveguide device, a phase retarder, a reflective-type light valve and a projection lens. The waveguide device includes a first grating for changing a propagation direction of a first polarized beam, and the phase retarder is disposed downstream from the first grating in a light path. The reflective-type light valve is disposed downstream from the phase retarder in the light path, and a projection lens is disposed downstream from the reflective-type light valve in the light path. The phase retarder and the first grating are disposed between the reflective-type light valve and the projection lens.

According to the above aspects, a waveguide device with diffractive grating structures is used with, for example, an optical projection system to propagate light. Therefore, a polarizing beam splitter or a TIR prism that separates an illumination light path and an image light path can be omitted from the optical projection system. This may, for example, reduce the optical path length and overall occupied space of an optical device and shorten the back focus of a projection lens, thus helping to thin and miniaturize the optical device. Besides, different parts of a grating may have different diffractive structures to achieve a prescribed distribution of diffraction efficiency for the grating, thereby expanding a light path (increasing light-emitting areas) and homogenizing incoming light beams.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etcetera, is used with reference to the orientation of the Figure(s) being described. The components of the invention can be positioned in a number of different orientations. As such, the directional terminology is used for purposes of illustration and is in no way limiting. Further, "First," "Second," etcetera, as used herein, are used as labels for nouns that they precede, and do not imply any type of ordering (e.g., spatial, temporal, logical, etcetera).

Figure 1:
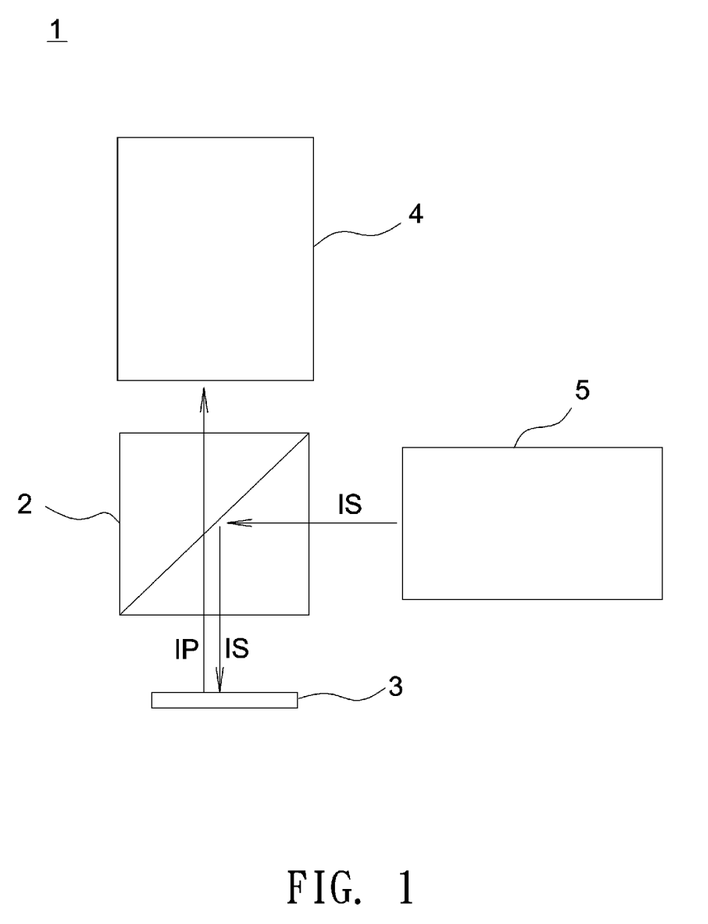
FIG. 1 shows a schematic diagram of an optical projection system according to an embodiment of the invention.

FIG. 1 shows a schematic diagram of an optical projection system (such as an optical projection engine). As shown in FIG. 1, the optical projection system 1 uses a polarizing beam splitter (PBS) 2 to form an illumination light path and an image light path separate from the illumination light path. For example, an S-polarized beam IS (illumination light beam) emitted from a light source 5 is reflected by the polarizing beam splitter 2 and incident to a liquid crystal on silicon (LCoS) panel 3, and the LCoS panel 3 reflects the S-polarized beam IS and coverts the S-polarized beam IS into a P-polarized beam IP. Therefore, the P-polarized beam IP (image light beam) exiting the LCoS panel 3 may pass through the polarizing beam splitter 2 to allow a projection lens 4 to project an image modulated by the LCoS panel 3 on a screen (not shown). It should be noted that the polarizing beam splitter 2 and the LCoS panel 3 may be replaced by a total internal reflection (TIR) prism and a digital micromirror device (DMD), respectively.

Figure 2A:
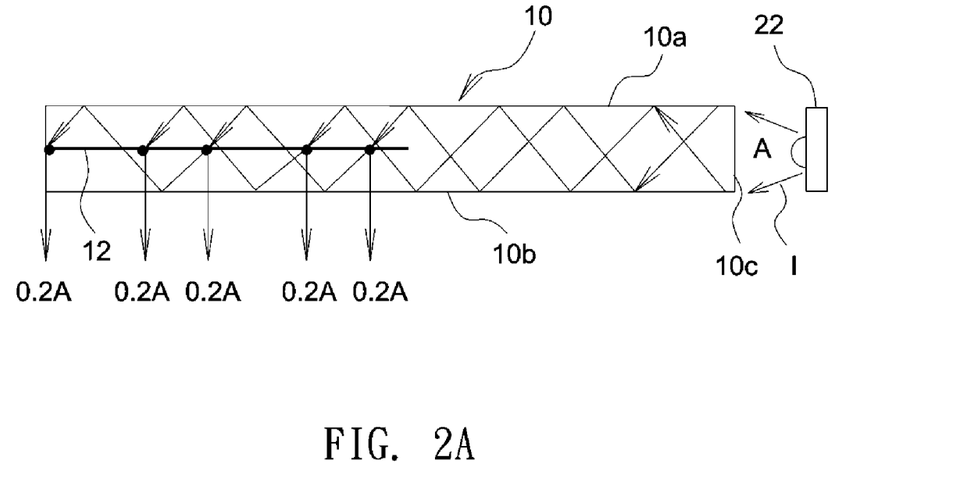
FIG. 2A shows a waveguide device according to an embodiment of the invention.
Figure 2B:
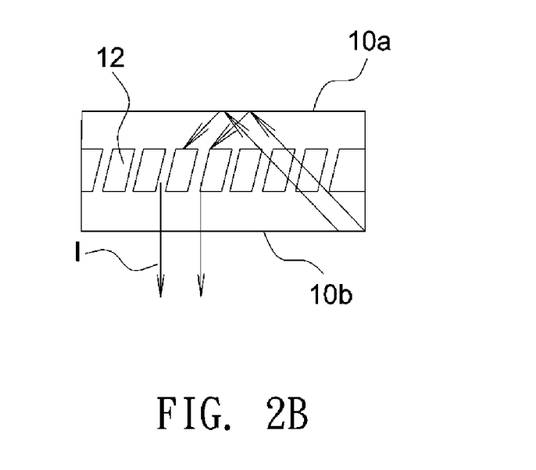
FIG. 2B is a partial enlarged diagram of the left end of the waveguide device shown in FIG. 2A.

FIG. 2A shows a waveguide device according to an embodiment of the invention, and FIG. 2B is a partial enlarged diagram of the left end of the waveguide device shown in FIG. 2A. As shown in FIG. 2A, the waveguide device 10 has a surface 10a, a surface 10b, a surface 10c and a grating 12. The surface 10a and the surface 10b are disposed on two opposite longitudinal sides of the waveguide device 10. The waveguide device 10 may be, for example, a light guide plate with the grating 12 or a waveguide-structured light pipe. The surface 10c of the waveguide device 10 receives a light beam I, and the grating 12 is disposed in a path of the light beam I. In this embodiment, the light beam I is transmitted from a light source 22. For example, the light beam I may be transmitted from a light combiner, a light collimation device (such as a collimator), a light homogenizer (such as an integration rod or a micro lens array), an LED, or a laser diode. Besides, the light beam I may be a polarized light beam or a non-polarized light beam. In this embodiment, the light beam I is incident to the waveguide device 10 at one end and transmitted to an opposite end by fulfilling the total internal reflection condition. As shown in FIG. 2B, when the light beam I reaches the grating 12, the grating 12 may disturb the total internal reflection condition through Bragg diffraction, and thus the light beam I is deflected downwardly and exits the waveguide device 10 through the surface 10b. Besides, in this embodiment, by varying different parts of the grating 12 with different grating structures that achieve respective diffraction efficiencies, the grating 12 may have a prescribed distribution of diffraction efficiency to expand and homogenize incoming light beams. For example, as shown in FIG. 2A, the diffraction efficiencies of the grating 12 measured at five positions (indicated by five points) from right to the left are 20%, 25%, 33%, 50% and 100%, respectively, to allow for an equal amount 0.2 A of light emission from each of the five positions, under the condition that a total amount of incident light is A. Therefore, the light emission is more uniform and the light path (or light-emitting area) can be expanded.

Figure 3A:
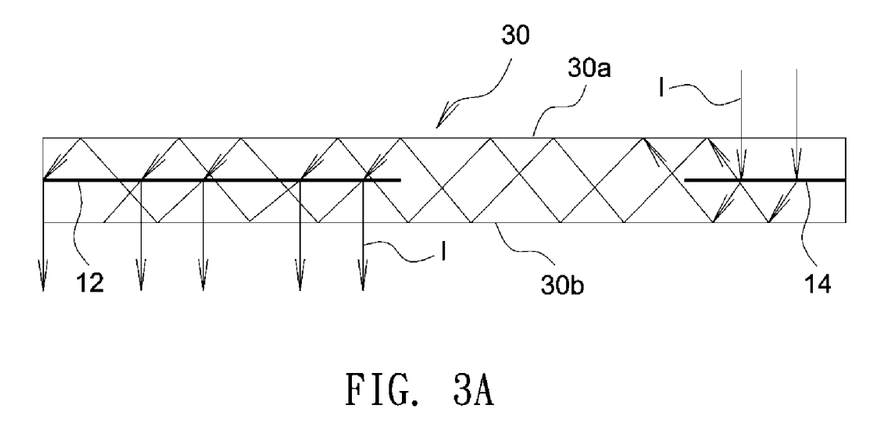
FIG. 3A shows a waveguide device according to another embodiment of the invention.
Figure 3B:
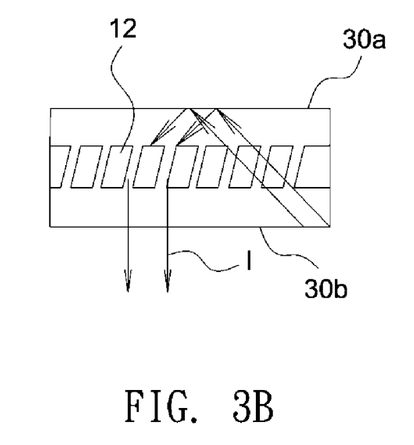
FIG. 3B is a partial enlarged diagram of the left end of the waveguide device shown in FIG. 3A.
Figure 3C:
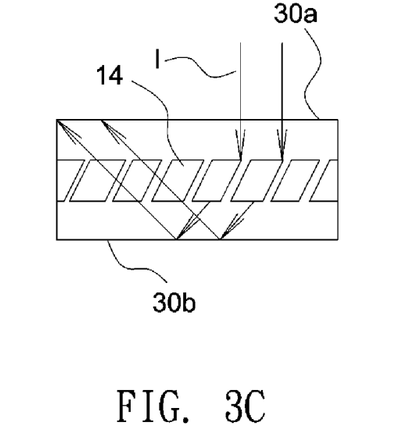
FIG. 3C is a partial enlarged diagram of the right end of the waveguide device shown in FIG. 3A.
Figure 4A:
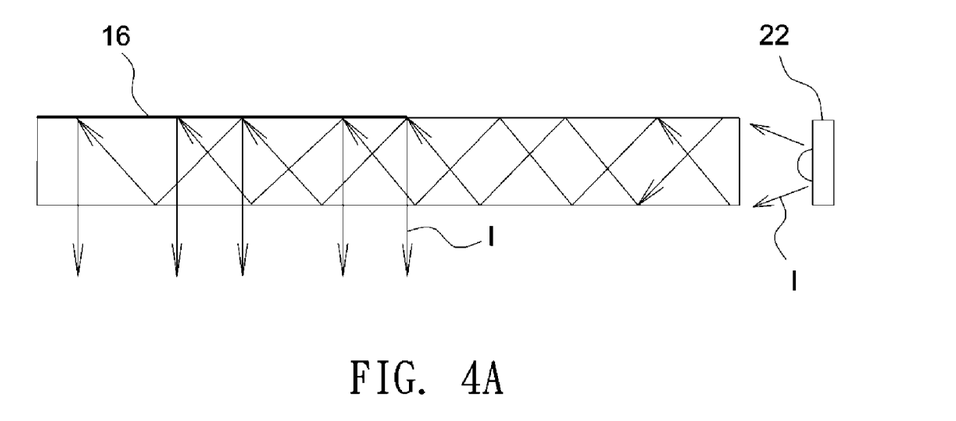
FIG. 4A shows a waveguide device according to another embodiment of the invention.
Figure 4B:
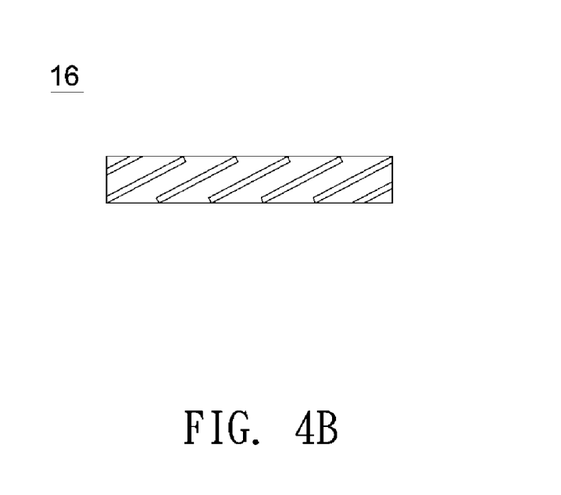
FIG. 4B shows a schematic diagram of a grating structure in the waveguide device of FIG. 4A.

FIG. 3A shows a waveguide device according to another embodiment of the invention, FIG. 3B is a partial enlarged diagram of the left end of the waveguide device shown in FIG. 3A, and FIG. 3C is a partial enlarged diagram of the right end of the waveguide device shown in FIG. 3A. In this embodiment, a waveguide device 30 includes a grating 12 and a grating 14 disposed on two opposite sides of the waveguide device 30. Specifically, the grating 12 is disposed on a light exit side and the grating 14 is disposed on a light incident side. When a light beam I downwardly enters the waveguide device 30 through the surface 30a, the light beam I is deflected by the grating 14 at a predetermined angle through diffraction, and the deflected light beam I that makes an angle of incidence with respect to an inner wall of the waveguide device 30 satisfies the condition of total internal reflection and thus may propagate in the waveguide device 30 through total internal reflection. Then, when the light beam I reaches the grating 12, the grating 12 deflects the light beam I to disturb the total internal reflection condition, so that the light beam I is deflected downwardly and exits the waveguide device 30 through the surface 30b. Therefore, according to the above embodiment where another grating 14 is disposed on the light incident end, a more flexible selection of light incident directions is achieved, and it becomes more easy for the waveguide device 30 to match various ranges of light incident angles. Moreover, the grating 14 may deflect incoming light beams at a prescribed angle to ensure the total internal reflection condition is met. Note the size and light-receiving area of each of the grating 12 and grating 14 can be adjusted according to actual demands. In this embodiment, a light-receiving area of the grating 12 is larger than that of the grating 14, but the invention is not limited thereto. Further, in this embodiment, the gratings 12 and 14 are transmissive-type gratings. In other embodiment, the transmissive-type grating may be replaced with a reflective-type grating 16 shown in FIG. 4A to achieve similar effects of light propagation through total internal reflection. As shown in FIG. 4B, an aligned direction or orientation of grating structures of the reflective-type grating 16 shown in FIG. 4B is different to an aligned direction or orientation of grating structures of the transmissive-type grating 12 and 14 shown in FIGS. 3B and 3C.

Figure 5:
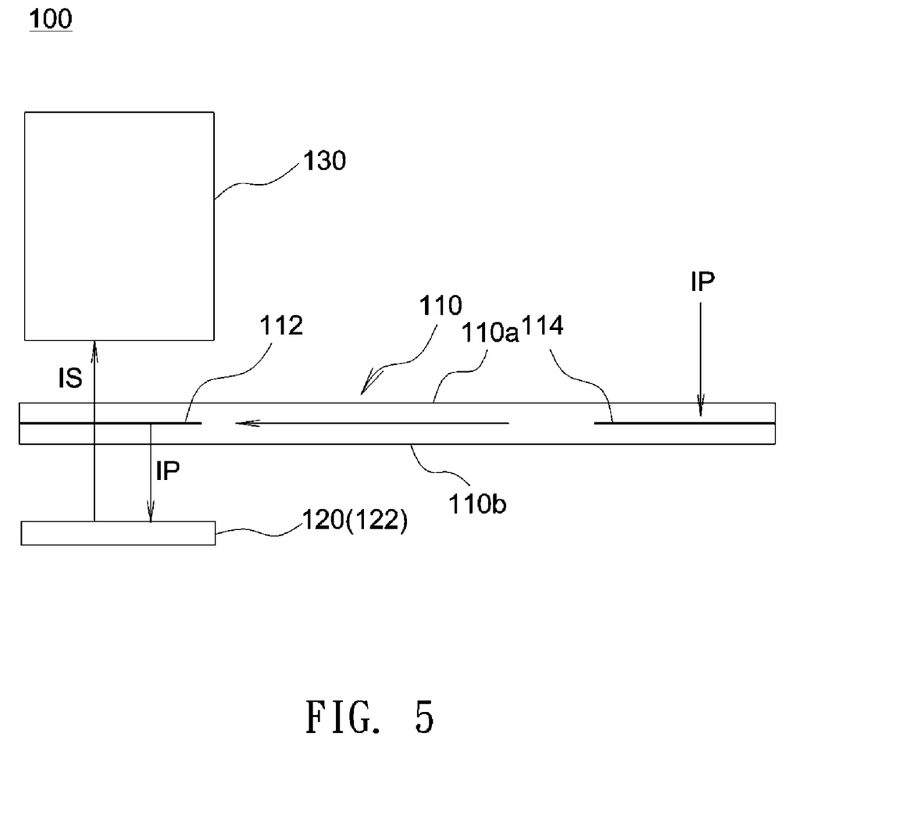
FIG. 5 shows a schematic diagram of an optical device according to an embodiment of the invention.

FIG. 5 shows a schematic diagram of an optical device (such as an optical projection engine) according to an embodiment of the invention. As shown in FIG. 5, an optical device 100 may be received in a casing (not shown) and includes a waveguide device 110, a reflective-type light valve 120 and a projection lens 130. The waveguide device 110 may receive a polarized light beam (such as a P-polarized beam IP) and includes a first surface 110a, a second surface 110b and at least one grating (such as gratings 112 and 114). The gratings 112 and 114 are disposed in a path of the P-polarized beam IP to change the propagation direction of the P-polarized beam IP. In this embodiment, the P-polarized beam IP passes through the first surface 110a of the waveguide device 110 and is deflected by the grating 114 to propagate in the waveguide device 110 through total internal reflection. Then, when the P-polarized beam IP reaches the grating 112, the grating 112 deflects the P-polarized beam IP to disturb the total internal reflection condition, so that the P-polarized beam IP is deflected downwardly to exit the waveguide device 110 through the surface 110b and reaches the reflective-type light valve 120. In this embodiment, the reflective-type light valve 120 may be an LCoS panel 122, and the LCoS panel 122 is disposed downstream from the surface 110b of the waveguide device 110 in a light path. The LCoS panel 122 reflects the P-polarized beam IP from the grating 112 and converts the P-polarized beam IP into an S-polarized beam IS. The S-polarized beam IS, being a modulated image beam, may pass through the grating 112 of the waveguide device 110 and enters the projection lens 130 downstream from the reflective-type light valve 120. Finally, the image beam passes through the projection lens 130 and is projected by the projection lens 130 onto a screen (not shown). According to the above embodiment, the waveguide device may substitute for a polarizing beam splitter or a TIR prism to reduce the optical path length and occupied space of the optical device 100 and to shorten the back focus of the projection lens 130. This may help to thin and miniaturize the optical device 100.

Figure 6:
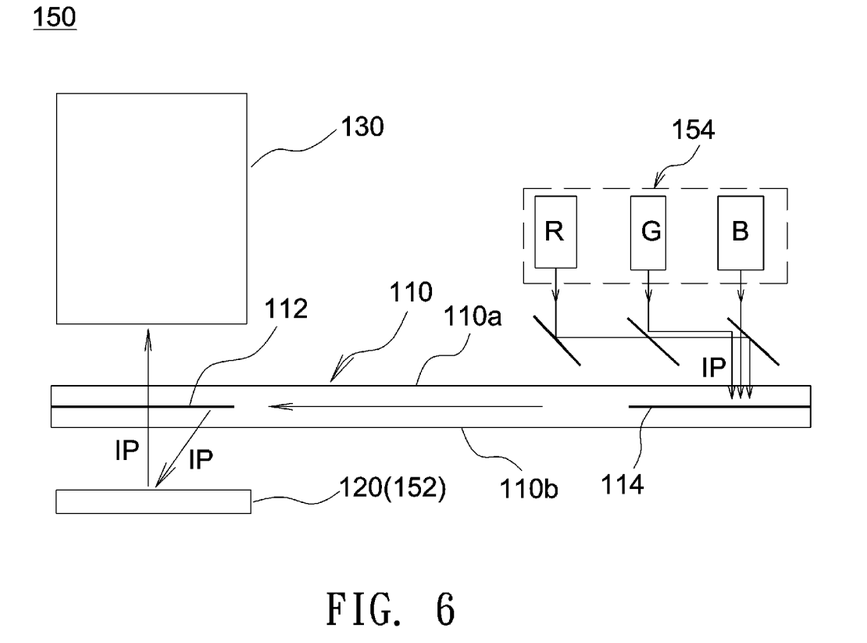
FIG. 6 shows a schematic diagram of an optical device according to another embodiment of the invention.
Figure 7:
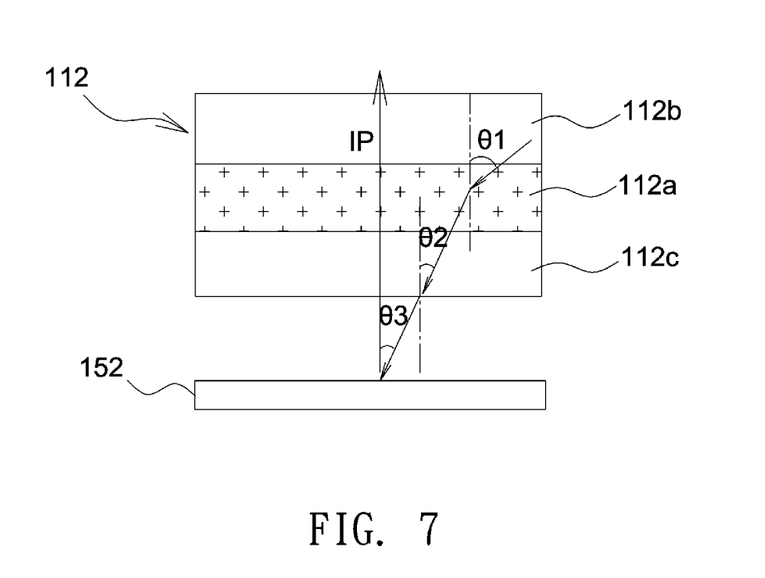
FIG. 7 shows a schematic diagram illustrating an exemplary angle design of a grating structure.

FIG. 6 shows a schematic diagram of an optical device according to another embodiment of the invention. This embodiment is different from the embodiment shown in FIG. 5 mainly in that a digital micromirror device (DMD) is used to substitute for the LCoS panel and serves as a reflective-type light valve. In this embodiment, red (R), green (G) and blue (B) laser diodes 154 output respective polarized light beams that are combined to form a P-polarized beam IP to be incident to the waveguide device 110. Because a laser light source is a common source of intensive polarized light, it may enhance diffraction efficiency when being used with the waveguide device 110. Further, though a digital micromirror device 152 serving as a reflective-type light valve does not change the polarization state of incoming light beams, an image beam modulated by the digital micromirror device 152 may still pass the grating 112 and enter the projection lens 130 relying on inherent characteristics of grating structures, where only light beams with prescribed incident angles are subject to diffractive effects of the grating structures. For example, as shown in FIG. 7, grating structures 112a of the grating 112 are interposed between two glass substrates 112b and 112c. In an exemplary embodiment, assume a light beam is incident to the grating structures 112a at an angle $\theta_1$ of 70 degrees, incident to an interface between the glass substrates 112c and air at an angle $\theta_2$ of 15.6 degrees, and incident to the digital micromirror device 152 at an angle $\theta_3$ of 12 degrees, the P-polarized beam IP (image beam) reflected by the digital micromirror device 152 may enter the projection lens 130 without being deflected by the grating 112 according to the above exemplary design of incident angles.

Figure 8:
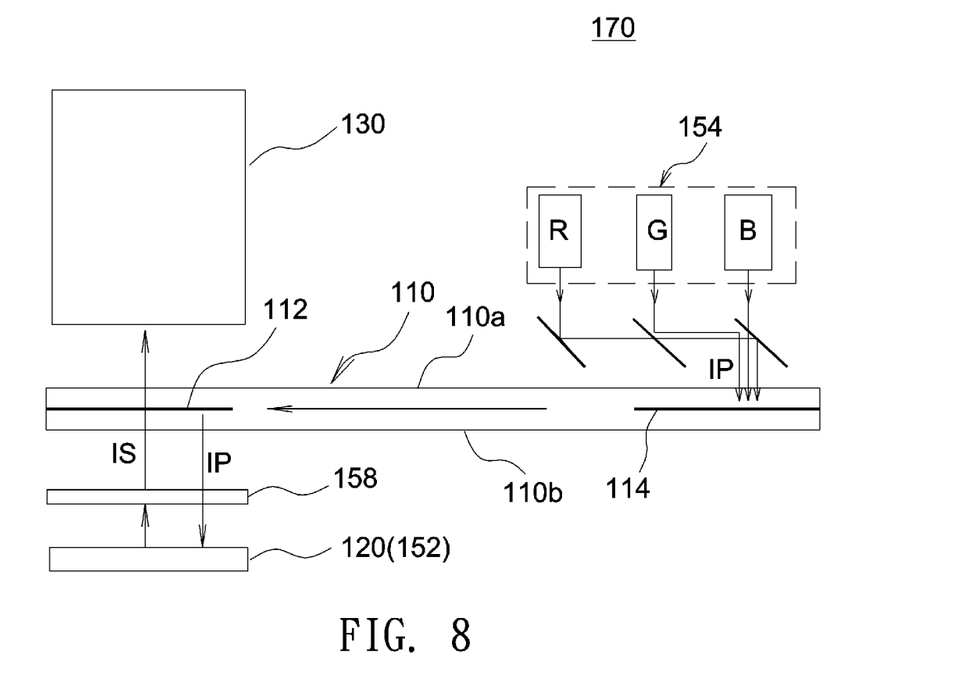
FIG. 8 shows a schematic diagram of an optical device according to another embodiment of the invention.

FIG. 8 shows a schematic diagram of an optical device according to another embodiment of the invention. This embodiment is different from the embodiment shown in FIG. 6 mainly in that a phase retarder is used to alter the polarization state of an image beam. As shown in FIG. 8, the projection lens 130 of an optical device 170 is disposed downstream from the digital micromirror device 152 (reflective-type light valve 120) in a light path, a quarter wave plate 158 is disposed downstream from the grating 112 in a light path, and the quarter wave plate 158 and the grating 112 are disposed between the digital micromirror device 152 and the projection lens 130. A light beam (such as a P-polarized beam IP) is deflected by the grating 112 and passes through the quarter wave plate 158. Then, the P-polarized beam IP is reflected by the digital micromirror device 152 and passes through the quarter wave plate 158 again. Therefore, the P-polarized beam IP may pass the quarter wave plate 158 twice to be converted into a S-polarized beam IS that is allowed to pass the grating 112 and enter the projection lens 130. It should be noted that using the quarter wave plate 158 described in the above embodiment is merely an exemplary way of polarization conversion. Other type of phase retarder can be used without limitation, as long as the effect of transforming the polarization state of a light beam is achieved.

Figure 9:
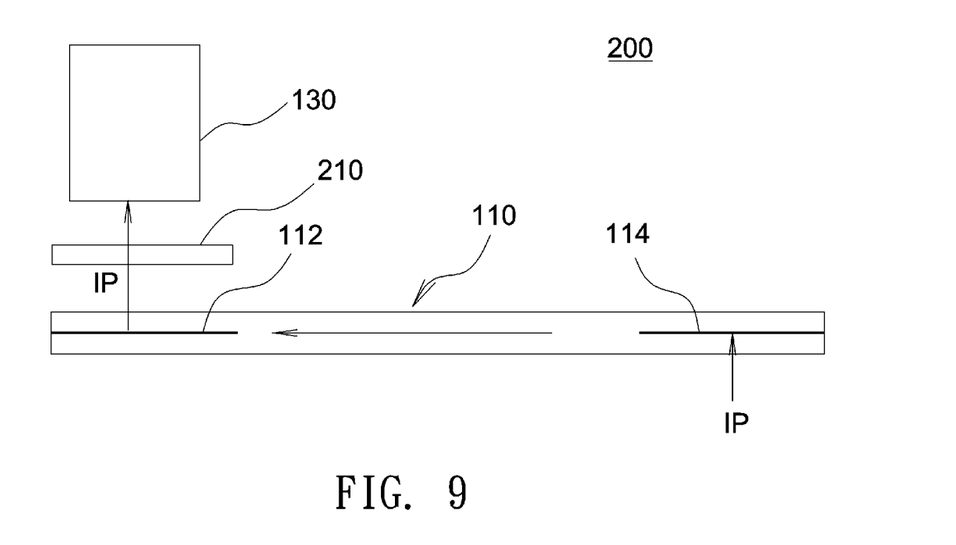
FIG. 9 shows a schematic diagram of an optical device according to another embodiment of the invention.

FIG. 9 shows a schematic diagram of an optical device according to another embodiment of the invention. As shown in FIG. 9, an optical device 200 has a transmissive-type light valve 210. For example, the transmissive-type light valve 210 may be a transmissive-type LCoS panel or a transmissive-type LCD. The transmissive-type light valve 210 cooperating with the waveguide device 110 may similarly function to deflect light beams and is advantageously for matching various sizes of a projection module.

According to the above embodiments, a waveguide device with diffractive grating structures is used with, for example, an optical projection system to propagate light. Therefore, a polarizing beam splitter or a TIR prism that separates an illumination light path and an image light path can be omitted from the optical projection system. This may, for example, reduce the optical path length and overall occupied space of an optical device and shorten the back focus of a projection lens, thus helping to thin and miniaturize the optical device. Besides, different parts of a grating may have different diffractive structures to achieve a prescribed distribution of diffraction efficiency for the grating, thereby expanding a light path (increasing light-emitting areas) and homogenizing incoming light beams.

Note the grating described in the above embodiment is not limited to a specific structure, as long as the effect of deflecting incoming light beams through diffraction is achieved. For example, the grating may be a holographic polymer dispersed liquid crystal (HPDLC) cell or a phase grating fabricated from a thin film of photoreactive polymers with prescribed surface transmittance or index of refraction, but the invention is not limited thereto.

The term "light valve", which is commonly known in the projector industry, refers to individually-addressed optical units of a spatial light modulator. The spatial light modulator includes multiple individually-addressed optical units arranged as a one-dimensional or a two-dimensional array. Each optical unit can be individually addressed by optical or electrical signals to alter its optical properties through various physical effects (e.g., Pockels effect, Kerr effect, photoacoustic effect, pagneto-optic effect, self electro-optic effect and photorefractive effect. Therefore, the multiple individually addressed optical units may modify incoming light beams and output image beams. The optical units may be, for example, micro mirrors or liquid crystal cells, and the light valve may be a digital micro-mirror device (DMD, a liquid-crystal-on-silicon panel (LCOS panel) or a transmissive type LCD panel.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the power transmission may be achieved by direct contact, indirect contact (via rigid or non-rigid intermediate objects) or actions at a distance (such as a magnetic force). Further, a connection between two elements is not limited to a direct direction and may be alternatively realized by the use of an intermediate object, such as a movable mechanical element, a controlling mechanical element, or a connection mechanical element, without influencing the power transmission. Therefore, unless limited otherwise, the terms "connected," "coupled," and "mounted" and variations thereof herein are used broadly and encompass direct and indirect connections, couplings, and mountings. It is intended that the scope of the invention be defined by the claims appended hereto and their equivalents in which all terms are meant in their broadest reasonable sense unless otherwise indicated.

What is claimed is:

1. An optical device, comprising:
   a waveguide device for receiving a first polarized beam and comprising:
      a first surface and a second surface; and
      a first grating disposed in a path of the first polarized beam to change a propagation direction of the first polarized beam, and the first polarized beam passing through the first surface, the first grating and the second surface in succession;
   a reflective-type light valve disposed downstream from the second surface of the waveguide device in a light path to convert the first polarized beam into an image beam; and
   a projection lens disposed downstream from the reflective-type light valve in the light path, and the image beam passing through the second surface of the waveguide device, the first grating and the projection lens in succession.

2. The optical device as claimed in claim 1, wherein the first grating deflects the first polarized beam to disturb a total internal reflection condition to allow the first polarized beam to exit the waveguide device and reach the reflective-type light valve.

3. The device as claimed in claim 1, wherein the first grating is a reflective-type grating or a transmissive-type grating.

4. The device as claimed in claim 1, wherein different parts of the first grating have different diffraction efficiencies.

5. The device as claimed in claim 1, wherein the reflective-type light valve is a digital micromirror device (DMD) or a liquid crystal on silicon (LCoS) panel.

6. The optical device as claimed in claim 1, further comprising:
a second grating for changing the propagation direction of the first polarized beam, wherein the first grating and second grating are disposed on two opposite sides of the waveguide device.

7. The optical device as claimed in claim 6, wherein the first polarized beam is deflected by the second grating to propagate in the waveguide device through total internal reflection, and the first grating deflects the light beam to disturb a total internal reflection condition to allow the first polarized beam to exit the waveguide device and reach the reflective-type light valve.

8. The optical device as claimed in claim 1, wherein the first polarized beam is emitted from at least one laser diode.

9. An optical device, comprising:
a waveguide device comprising a first grating for changing a propagation direction of a first polarized beam;
a phase retarder disposed downstream from the first grating in a light path;
a reflective-type light valve disposed downstream from the phase retarder in the light path; and
a projection lens disposed downstream from the reflective-type light valve in the light path, and the phase retarder and the first grating being disposed in the light path between the reflective-type light valve and the projection lens.

10. The optical device as claimed in claim 9, wherein the phase retarder is a quarter wave plate.

11. The optical device as claimed in claim 9, wherein the first grating is a reflective-type grating or a transmissive-type grating.

12. The optical device as claimed in claim 9, wherein different parts of the first grating have different diffraction efficiencies.

13. The optical device as claimed in claim 9, wherein the reflective-type light valve is a digital micromirror device (DMD) or a liquid crystal on silicon (LCoS) panel.

14. The optical device as claimed in claim 9, further comprising:
a second grating for changing the propagation direction of the first polarized beam, wherein the first grating and second grating are disposed on two opposite sides of the waveguide device.

15. The optical device as claimed in claim 14, wherein the first polarized beam is deflected by the second grating to propagate in the waveguide device through total internal reflection, and the first grating deflects the light beam to disturb a total internal reflection condition to allow the first polarized beam to exit the waveguide device and reach the reflective-type light valve.

16. An optical device, comprising:
a waveguide device for receiving a first polarized beam and comprising:
a first surface and a second surface; and
a first grating disposed in a path of the first polarized beam to change a propagation direction of the first polarized beam, and the first polarized beam passing through the first surface, the first grating and the second surface;
a transmissive-type light valve disposed downstream from the waveguide device in a light path to convert the first polarized beam into an image beam; and
a projection lens disposed downstream from the transmissive-type light valve in the light path, wherein no polarizing plate is provided in the light path between the transmissive-type light valve and the projection lens.

17. The optical device as claimed in claim 16, wherein different parts of the first grating have different diffraction efficiencies.

18. The optical device as claimed in claim 16, wherein the transmissive-type light valve is a transmissive-type LCoS panel or a transmissive-type LCD.

19. The optical device as claimed in claim 16, further comprising:
a second grating for changing the propagation direction of the first polarized beam, wherein the first grating and second grating are disposed on two opposite sides of the waveguide device.

20. The optical device as claimed in claim 19, wherein the first polarized beam is deflected by the second grating to propagate in the waveguide device through total internal reflection, and the first grating deflects the light beam to disturb a total internal reflection condition to allow the first polarized beam to exit the waveguide device and reach the reflective-type light valve.

* * * * *